(12) United States Patent
Chen

(10) Patent No.: US 8,036,494 B2
(45) Date of Patent: Oct. 11, 2011

(54) ENHANCING IMAGE RESOLUTION

(75) Inventor: Mei Chen, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2329 days.

(21) Appl. No.: 10/824,692

(22) Filed: Apr. 15, 2004

(65) Prior Publication Data

US 2005/0232514 A1   Oct. 20, 2005

(51) Int. Cl.
*G06K 9/32* (2006.01)

(52) U.S. Cl. .................. 382/299; 382/298; 382/300

(58) Field of Classification Search .............. 382/298, 382/299, 300
See application file for complete search history.

(56) References Cited

U.S. PATENT DOCUMENTS

| | | | |
|---|---|---|---|
| 5,053,875 A | 10/1991 | Ishii et al. | |
| 5,557,684 A | 9/1996 | Wang et al. | |
| 5,719,594 A | 2/1998 | Potu | |
| 5,973,733 A | 10/1999 | Gove | |
| 6,249,613 B1 | 6/2001 | Crinon et al. | |
| 6,269,175 B1 | 7/2001 | Hanna et al. | |
| 6,304,682 B1 * | 10/2001 | Patti | 382/299 |
| 6,307,560 B1 * | 10/2001 | Kondo et al. | 345/619 |
| 6,385,245 B1 | 5/2002 | De Haan et al. | |
| 6,393,163 B1 | 5/2002 | Burt | |
| 6,466,618 B1 | 10/2002 | Messing et al. | |
| 6,476,873 B1 | 11/2002 | Maeng | |
| 6,570,612 B1 | 5/2003 | Saund et al. | |
| 6,587,599 B1 | 7/2003 | Huang | |
| 6,625,333 B1 * | 9/2003 | Wang et al. | 382/300 |
| 6,628,805 B1 | 9/2003 | Hansen et al. | |
| 6,718,073 B1 * | 4/2004 | Kondo et al. | 382/299 |
| 6,782,132 B1 * | 8/2004 | Fogg | 382/232 |
| 6,798,834 B1 * | 9/2004 | Murakami et al. | 375/240.12 |
| 6,983,080 B2 * | 1/2006 | Wenstrand et al. | 382/284 |
| 7,038,729 B2 * | 5/2006 | Kondo et al. | 348/581 |
| 7,043,058 B2 | 5/2006 | Cornog et al. | |
| 7,088,773 B2 * | 8/2006 | Paniconi et al. | 375/240.16 |
| 7,119,837 B2 * | 10/2006 | Soupliotis et al. | 348/208.99 |

(Continued)

FOREIGN PATENT DOCUMENTS

EP   1117251   7/2001

(Continued)

OTHER PUBLICATIONS

R. Tsai et al., "Multiframe Image Restoration and Registration," Advances in Computer Vision and Image Processing, vol. 1, pp. 317-320, 1984.*

(Continued)

*Primary Examiner* — Bhavesh Mehta
*Assistant Examiner* — Sean Motsinger

(57) ABSTRACT

Methods, machines, and machine-readable media for enhancing image resolution are described. In one aspect, a respective motion map is computed for each pairing of a reference image and a respective image neighboring the reference image in a sequence of base images. Each motion map includes a set of motion vectors mapping reference image pixels to respective neighboring image pixels. Respective regions of a target image are assigned to motion classes based on the computed motion maps. The target image has a target resolution level and the base images have a base resolution level equal to or lower than the target resolution level. Pixel values for the target image are computed based on corresponding pixel value contributions from the motion-compensated neighboring base images selected in accordance with the motion classes assigned to the target image regions.

55 Claims, 6 Drawing Sheets

U.S. PATENT DOCUMENTS

| | | | |
|---|---|---|---|
| 7,142,600 B1 | 11/2006 | Schonfeld et al. | |
| 7,729,558 B2 * | 6/2010 | Kondo et al. | 382/275 |
| 2001/0048763 A1 | 12/2001 | Takatsuka et al. | |
| 2002/0118761 A1 | 8/2002 | Lee | |
| 2003/0012457 A1 | 1/2003 | Solecki | |
| 2003/0016884 A1 | 1/2003 | Altunbasak et al. | |
| 2003/0031382 A1 | 2/2003 | Broekaart | |
| 2003/0044087 A1 * | 3/2003 | Kondo et al. | 382/298 |
| 2003/0053692 A1 | 3/2003 | Hong et al. | |
| 2003/0090593 A1 | 5/2003 | Xiong | |
| 2003/0108238 A1 | 6/2003 | Xu | |
| 2003/0117611 A1 | 6/2003 | Chon et al. | |
| 2004/0114799 A1 | 6/2004 | Xu | |
| 2004/0151401 A1 * | 8/2004 | Sawhney et al. | 382/299 |
| 2006/0188013 A1 | 8/2006 | Coimbra et al. | |
| 2010/0182511 A1 * | 7/2010 | Xu | 348/699 |

FOREIGN PATENT DOCUMENTS

| | | |
|---|---|---|
| JP | 2000227960 | 8/2000 |
| WO | WO 9844739 | 10/1998 |
| WO | WO99/07156 | 2/1999 |
| WO | WO 00/13407 | 3/2000 |
| WO | WO 0158129 | 8/2001 |
| WO | WO 03043348 | 5/2003 |

OTHER PUBLICATIONS

S. Borman et al., "Spatial Resolution Enhancement of Low-Resolution Image Sequences a Comprehensive Review with Directions for Future Research," Laboratory for Image and Signal Analysis, University of Notre Dame, Jul. 1998.*

S. Park et al., "Super-Resolution Image Reconstruction: A Technical Overview," IEEE Signal Processing Magazine, pp. 21-36, May 2003.*

C. Segall et al., "High-Resolution Images from Low-Resolution Compressed Video," IEEE Signal Processing Magazine, pp. 37-48, May 2003.*

A. Tekalp et al., "High-Resolution Image Reconstruction from Lower-Resolution Image Sequences and Space-Varying Image Restoration," IEEE 1992.*

R. Schultz et al., "Subpixel Motion Estimation for Super-Resolution Image Sequence Enhancement," Journal of Visual Communication and Image Representation, vol. 9 No. 1, Mar. 1998.*

P. Eren et al., "Robust, Object-Based High-Resolution Image Reconstruction from Low-Resolution Video," IEEE Transactions on Image Processing, vol. 6 No. 10, Oct. 1997.*

Y. Rubnew, "Empirical Evaluation of Dissimilarity Measures for Color and Texture," Computer Vision and Image Understanding, vol. 84, 2001.*

Musmann et al., "Advances in picture coding," Proceedings of the IEEE 73(4), 1985, 523-548.*

Bernd Heisele, "Motion-Based Object Detection and Tracking in Color Image Sequences," Proceedings IEEE 4th International Conference on Image Processing (ICIP-97), vol. III, Oct. 1997.

Hansen, M., et al.: "Real-Time scene stabilization and Mosaic Construction"; Image Understanding WorkShop; NDv. 1994; pp. 457-465; XPOOO852887.

Kang-Sun Choi, et al., "An Efficient Digital Images Stabilizing Technique for Mobile Video Communications": IEEE, Piscataway. NJ.: Jun. 15, 2000; pp. 246-247; XP002326257.

J.-R Ohm, P. Ma : "Feature-based cluster segmentation of im~e sequences," Aroceedings IEEE 4th Inte{national Conference on Image Processing (ICIP-97), va .111, pp. 178-181, Oct. 1997.

J. Y. A. Wang and E H. Adelson. Layered Representation for Motion Analysis. Proceedings of the IEEE Computer Society Conference on Computer Vision and Pattern Recognition 1993. pp. 361-366, New York, Jun. 1993.

David Tweed and Andrew Calway. Moving Object Graphs and Layer Extraction from Image sequences. In Tim Cootes and Chris Taylor, editors, Proceedings of the British Machine Vision Conference, pp. 133-142. BMVA, Sep. 2001.

Qiard G. Medioni, Isaac Cohen, Franc;ois Brenond, Somboon Hongeng, Ramakant Nevatia: Event Detection and Analysis from Video Streams: IEEE Transactions on Pattern Analysis and Machine Intelligence 23(8): 873-889 (2001).

Remi Megret, Daniel DeMenthon. A Survey of Spatio-Temporal Grouping Techniques. Research report CS-TR-443, LAMP, University of Maryland, Aug. 2002.

Zhu ZhiGang, Xu GuangYou, Yang YuOong, Jin J S. Camera stabilization based on 2.50 motion estimation and inertial motion filtering[A]. IEEE. International Conference on Intelligent Vehicles[C]. Stuttgart, Germany: IEEE, 1998.

J. Y. A. Wang and E. H. Adelson. Spatio-Temporal Segmentation of Video Data. Proceedings of SPIEon Image and Video Processing II, vol. 2182, pp. 120-131, San Jose. Feb. 1994.

M. J. Black and P. Anandan. The robust estimation of mUltiple motions: Parametric and piecewise-smooth flow fields. Computer Vision and Image Understanding, 63(1 ):7.5-104, Jan. 1996.

Irani et al., "Improving Resolution by Image Registration," CVGIP: Graphical Models and Image Processing, vol. 53, No. 3, pp. 231-239 (May 1991).

Adelson et al., "Pyramid Methods in Image Processing," RCA Engineer, 29-6, pp. 33-41 (Nov./Dec. 1984).

* cited by examiner

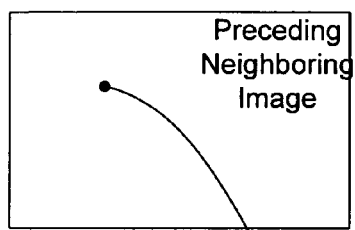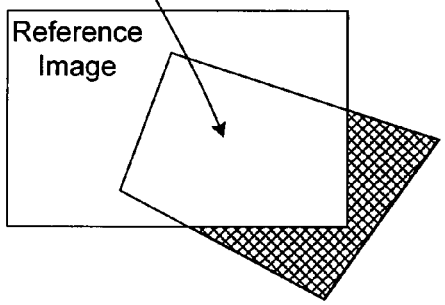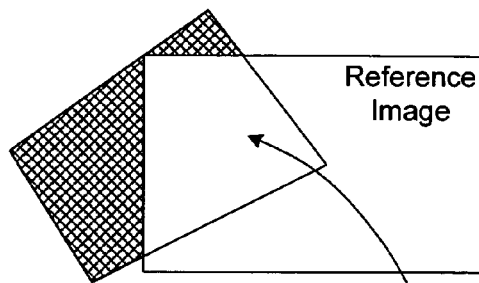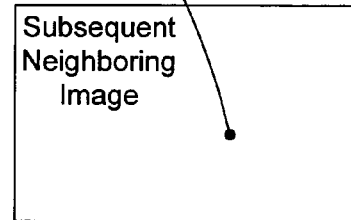
FIG. 5A　　　　　　　　　　　　　　FIG. 5B
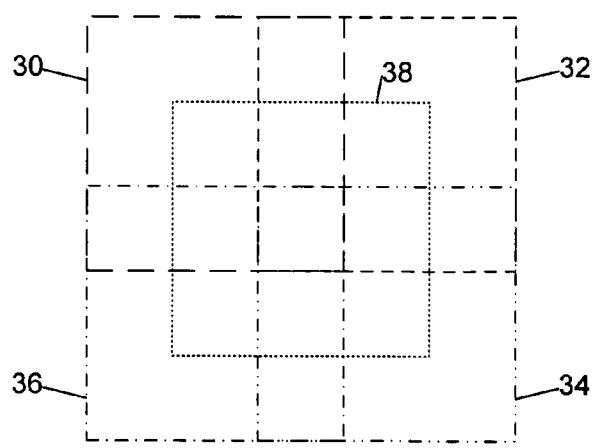
FIG. 6

US 8,036,494 B2

ENHANCING IMAGE RESOLUTION

BACKGROUND

The resolution of an image is determined by the physical characteristics of the sensor that is used to capture the image. In some resolution enhancement approaches, the spatial dimension of an image is increased by interpolating between pixel values of a single image to generate an enhanced image. Both linear and non-linear interpolation techniques have been applied to a single image to produce an image with a higher spatial dimension than the original image. In these resolution enhancement techniques, however, the overall information content in the enhanced image is the same as the original image: the pixel number is increased, but the resolution is not improved. In other approaches, image resolution is increased by obtaining multiple displaced images of the scene and combining the information from the multiple images into an enhanced image. The process of reconstructing an image from several displaced images of the same scene often is referred to as "super resolution". In these resolution enhancement techniques, the overall information content in the enhanced image may be greater than the information content in the individual original images.

In some super resolution methods, one of the lower resolution images in a sequence of lower resolution images is designated as a reference image. The coordinate frame of the reference image is up-projected to the higher resolution level to define the coordinate frame of the higher resolution image. Motion vectors between the reference image and each of a selected number of lower-resolution images neighboring the reference image in the multi-image sequence are estimated. The motion vectors then are up-projected to the coordinate frame of the higher resolution image. The up-projected motion vectors are used to re-map the neighboring images to the coordinate frame of the higher resolution image. Next, the coordinate frame of the higher resolution image is populated with pixel values that are computed based on combinations of pixel values from the re-mapped lower resolution images. In some approaches, a non-linear interpolation technique is used to reconstruct the higher resolution image from the re-mapped pixel values.

SUMMARY

The invention features methods, machines, and machine-readable media for enhancing image resolution.

In one aspect of the invention, a respective motion map is computed for each pairing of a reference image and a respective image neighboring the reference image in a sequence of base images. Each motion map comprises a set of motion vectors mapping reference image pixels to respective neighboring image pixels. Respective regions of a target image are assigned to motion classes based on the computed motion maps. The target image has a target resolution level and the base images have a base resolution level equal to or lower than the target resolution level. Pixel values for the target image are computed based on corresponding pixel value contributions from the base images selected in accordance with the motion classes assigned to the target image regions.

Other features and advantages of the invention will become apparent from the following description, including the drawings and the claims.

DESCRIPTION OF DRAWINGS

FIG. 5A is a diagrammatic view of a neighboring image re-mapped to a coordinate frame of a subsequent reference image in accordance with a computed motion map.

FIG. 5B is a diagrammatic view of a neighboring image re-mapped to a coordinate frame of a preceding reference image in accordance with a computed motion map.

FIG. 6 shows an example of five windows that are used to compute motion maps in accordance with an implementation of the method of FIG. 2B.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The image processing embodiments described below incorporate a dynamic approach to enhance the spatial resolution of an image sequence that allows different regions of the scene captured in the images to be treated differently. In this way, these embodiments are able to avoid artifacts that otherwise might result from treating all regions of the scene in the same way during the resolution enhancement process. In addition, these embodiments are able to dynamically tailor the image resolution enhance process in an intelligent way. In particular, these embodiments deploy image processing resources to different regions of an enhanced resolution image at varying computational intensity levels to achieve high quality resolution enhancement results in an accurate and efficient way.

Figure 1:
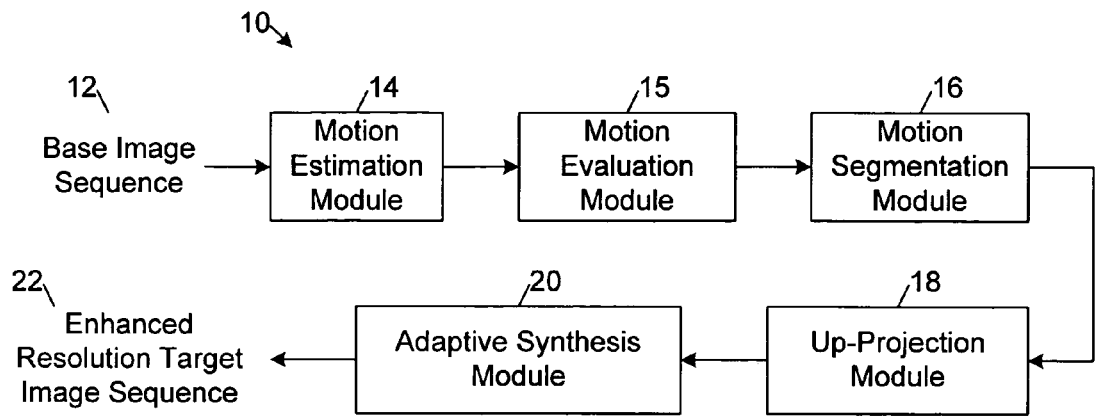
FIG. 1 is a block diagram of an embodiment of a system for enhancing the resolution of a reference image in a sequence of base images.

FIG. 1 shows an embodiment of a system 10 for processing a sequence of base images 12 that includes a motion estimation module 14, a motion evaluation module 15, a motion segmentation module 16, an up-projection module 18, and an adaptive synthesis module 20. The system 10 is configured to produce a sequence of enhanced resolution target images 22. In some implementations, the system 10 also may be configured to produce a sequence of target images that have the same spatial resolution as the base images 12, but in which any compression, luminance and color aliasing artifacts associated with the base images are reduced.

In general, the modules 14-20 of system 10 are not limited to any particular hardware or software configuration, but rather they may be implemented in any computing or processing environment, including in digital electronic circuitry or in computer hardware, firmware, device driver, or software. For example, in some implementations, these modules 14-20 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

The base image sequence 12 may correspond to an original base image sequence that was captured by an image sensor (e.g., a video image sequence or a still image sequence) or a processed version of such an original base image sequence. For example, the base image sequence 12 may consist of a sampling of the images selected from an original base image sequence that was captured by an image sensor or a compressed or reduced-resolution version of an original base image sequence that was captured by an image sensor. In order to achieve spatial resolution enhancement of the base image sequence 12, at least some of the base images correspond to displaced images of the same scene so that different samplings of the scene can be combined into an enhanced resolution target image.

Each target image 22 is produced from pixel value contributions from a selected set of the base images 12, including one that is designated the "reference image" and one or more base images that neighbor the reference image in the sequence. As used herein, the term "neighboring base images" refers to base images within a prescribed number of base images of each other in a base image sequence without regard to the temporal ordering of the neighboring base images in terms of capture time. In addition, the term "successive base images" refers to adjacent base images in a base image sequence that may be ordered chronologically or reverse-chronologically in terms of capture time. The number of neighboring images used to compute a target image, and the relative positions of the neighboring images in the sequence, are implementation-specific parameters. In some implementations, three successive neighboring base images on either side of the reference image in the base image sequence are processed with each reference image, for a total of seven base images that are processed for each target image.

Figure 2A:
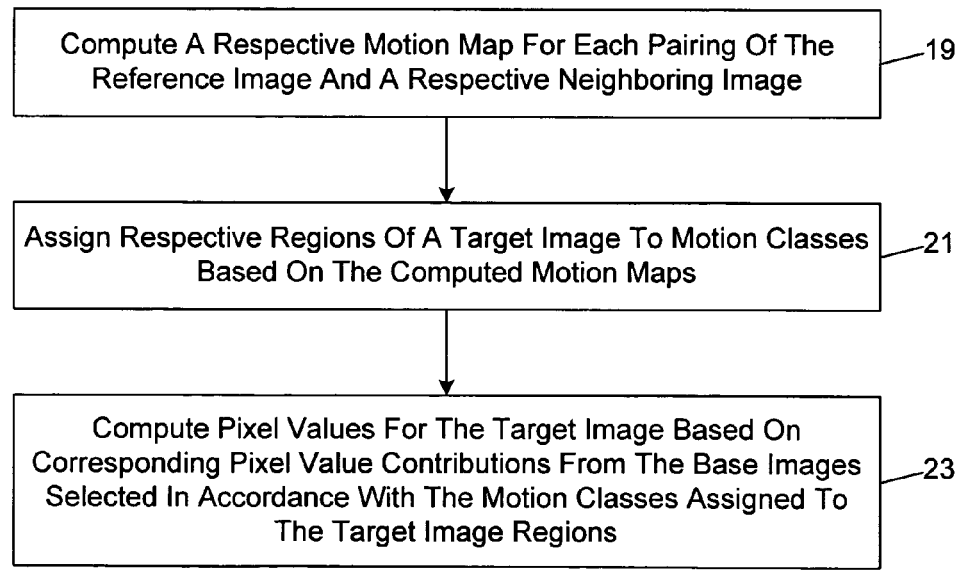
FIG. 2A is a flow diagram of an embodiment of a method of enhancing the resolution of a reference image in a sequence of base images.

Referring to FIG. 2A, in some embodiments, image processing system 10 processes base image sequence 12 to produce the target image sequence 22 as follows. Motion estimation module 14 computes a respective motion map for each pairing of a reference image and a respective image neighboring the reference image in the sequence of base images 12 (block 19). Each motion map comprises a set of motion vectors mapping reference image pixels to respective neighboring image pixels. Respective regions of a target image 22 are assigned to motion classes based on the computed motion maps (block 21). The target image has a target resolution level and the base images have a base resolution level equal to or lower than the target resolution level. Pixel values for the target image are computed based on corresponding pixel value contributions from the base images 12 selected in accordance with the motion classes assigned to the target image regions (block 23).

Figure 2B:
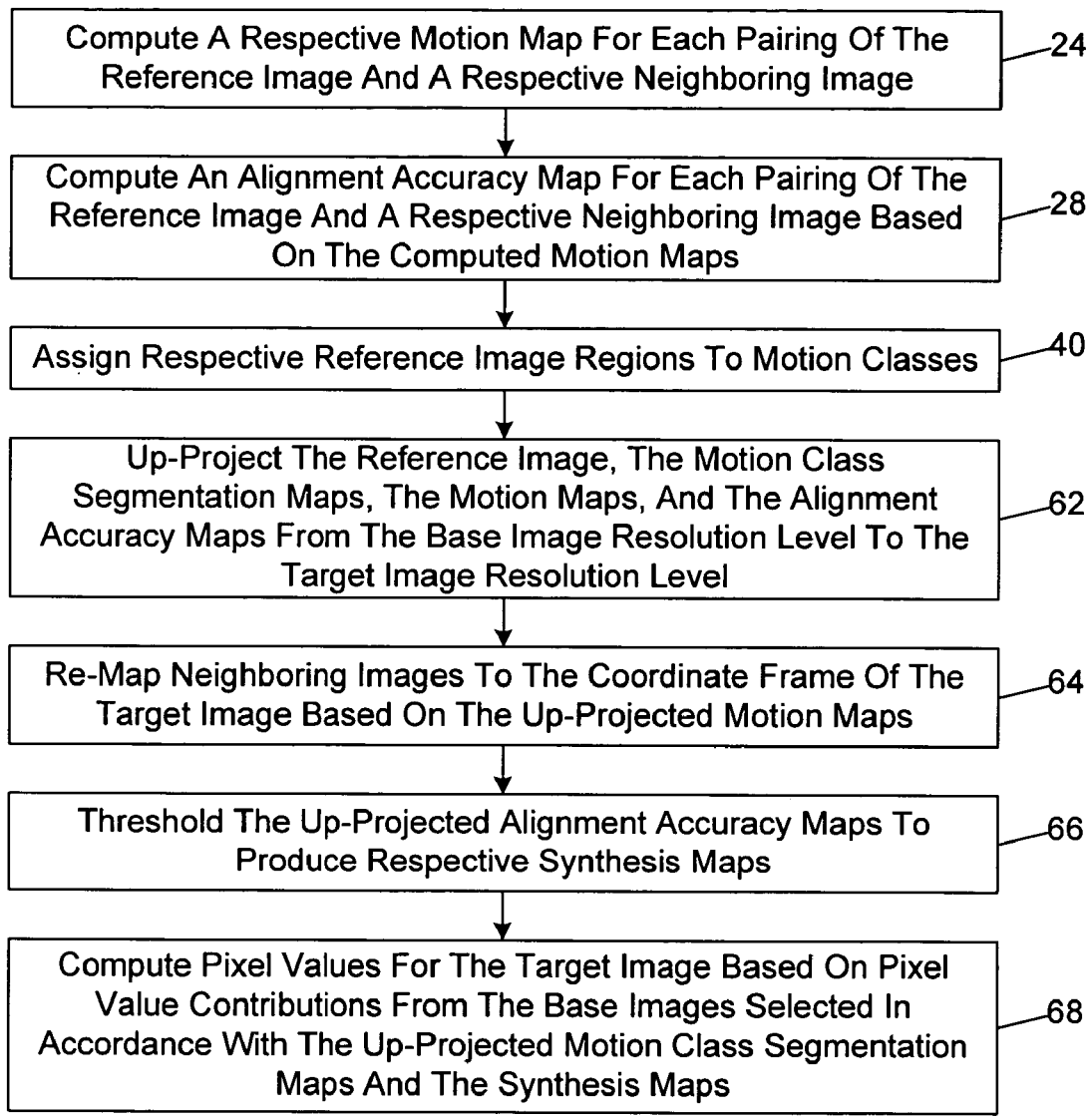
FIG. 2B is a flow diagram of an implementation of the embodiment of FIG. 2A.
Figure 3:
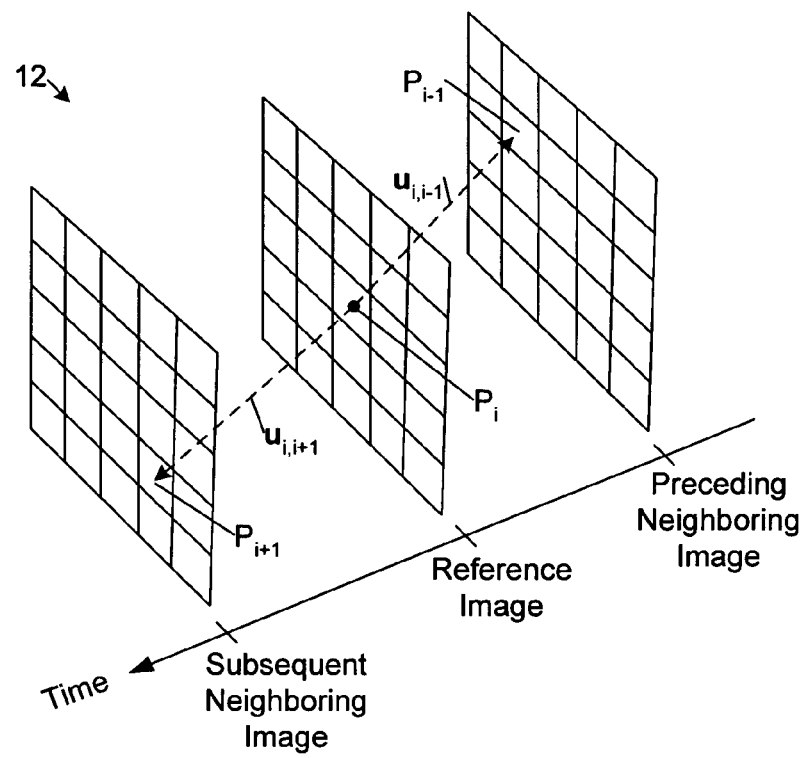
FIG. 3 is a diagrammatic view of motion vectors mapping a pixel of a reference image to respective pixels of images neighboring the reference image in a sequence of base images.

FIG. 2B shows one of many possible implementations of the image processing embodiment of FIG. 2A. Motion estimation module 14 computes a respective motion map (or motion correspondence map) for each pairing of the reference image and a respective neighboring image (block 24). Each motion map includes a set of motion vectors $u_{i,k}$ that map each reference image pixel $P_i$ to respective neighboring image pixels $P_{i+1}$, $P_{i-1}$, as shown in FIG. 3. The motion vectors estimate the inter-frame motion of features or objects appearing in the base images 12. In general, motion estimation module 14 may compute motion vectors based on any model for estimating the motion of image objects. For example, motion vectors may be computed based on an affine motion model that describes motions that typically appear in image sequences, including translation, rotation, zoom, and shear. Affine motion is parameterized by six parameters as follows:

$$U_x(x,y)=a_{x0}+a_{x1}x+a_{x2}y \quad (1)$$

$$U_y(x,y)=a_{y0}+a_{y1}x+a_{y2}y \quad (2)$$

wherein $U_x(x,y)$ and $U_y(x,y)$ are the x and y components of a velocity motion vector at point (x,y), respectively, and the $a_k$'s are the affine motion parameters.

Figure 4A:
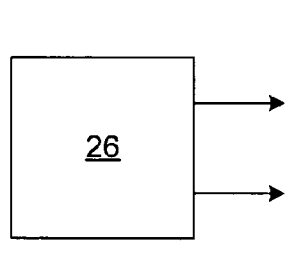
FIGS. 4A-4D are diagrammatic views of different respective motions that typically appear in dynamic images.
Figure 4B:
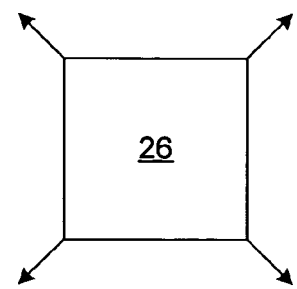
Figure 4C:
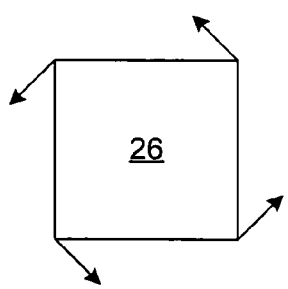
Figure 4D:
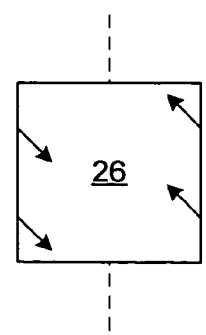

Examples of an affine motion model are illustrated in FIGS. 4A-4D. FIG. 4A shows parallel motion vectors that represent a translation of an object 26 at a constant distance from an image sensor (or image sensors). FIG. 4B shows vectors having a common focus of expansion that represent translation of object 26 in depth relative to the image sensor, or zooming (uniform scaling) motion. FIG. 4C shows concentric motion vectors that represent rotation of object 26 within the imaging plane. FIG. 4D represents rotation of object 26 with respect to Y axis.

In some embodiments, the motion maps of image pairs are represented as vector fields in the coordinate system of the reference image, which defines the coordinate system of the target image to be enhanced. A vector field U(P) the reference image $I_r(P)$, and the neighboring image $I_t(P)$ (e.g., one of the images preceding or succeeding the image to be enhanced in a image sequence), satisfy:

$$I_r(P)=I_t(P-U(P)) \quad (3)$$

where P=P(x,y) represents pixel coordinates. Therefore, each of the neighboring images can be warped to the coordinate frame of the corresponding reference image using equation (3) to create:

$$I_t^w(P)=I_t(P-U(P)) \quad (4)$$

where $I_t^w(P)$ is the warped neighboring image. FIG. 5A shows an example of a preceding neighboring image re-mapped to the coordinate frame of a corresponding reference image in accordance with equation (4), where the cross-hatched areas are regions of the re-mapped image that do not overlap with the the coordinate frame of the reference image. Similarly, FIG. 5B shows an example of a subsequent neighboring image re-mapped to the coordinate frame of a corresponding reference image in accordance with equation (4).

In a typical image sequence of base images, if the motion vectors are computed correctly, the warped neighboring image should look very similar to the corresponding reference image. In the case of video sequences, the reference and neighboring images are captured at two different times. As a result, the pixel motion between images is due to both camera motion and also the motion of scene points moving independently. The motion of pixels is therefore unconstrained (non-parametric). Accordingly, in some embodiments, motion estimation module 14 computes movements of individual pixels or groups of pixels from a given base image to a neighboring base image based on a non-parametric optical flow model (or dense motion model). The motion estimates may be computed for one or both of forward and backwards transitions in time (i.e., from an earlier-captured base image to a later-captured base image, or from a later-captured base image to an earlier-captured base image).

In some embodiments, motion is modeled as a smoothly varying flow field, and motion analysis exploits local smoothness of optical flow fields. In this optical flow model, the movements are represented by velocity vectors (dx/dt, dy/dt) that describe how quickly a pixel (or a group of pixels) is moving across an image, and the direction of pixel movement. The optical flow model represents a projection of three-dimensional object motion onto the image sensor's two-dimensional image plane. Any one of a wide variety of optical flow computation methods may be used by the motion estimation module 14 to compute motion vectors. In some implementations, a multi-scale coarse-to-fine algorithm based on a gradient approach may be used to compute the optical flow motion vectors.

In some of these embodiments, the reference and neighboring image pairs are represented by Laplacian or Gaussian multi-resolution pyramids. In this way, these embodiments are able to accommodate a wide range of displacements, while avoiding excessive use of computational resources and generation of false matches. In particular, using a multi-resolution pyramid approach allows large displacements to be computed at low spatial resolution. Images at higher spatial resolution are used to improve the accuracy of displacement estimation by incrementally estimating finer displacements. Another advantage of using image pyramids is the reduction of false matches, which is caused mainly by the mismatches at higher resolutions under large motion. Motion estimation in a multi-resolution framework helps to eliminate problems of this type, since larger displacements are computed using images of lower spatial resolution, where they become small displacements due to sub-sampling.

In these embodiments, motion estimation module 14 uses a pyramid-based hierarchical image alignment technique to align two input images (i.e., a neighboring image and a corresponding reference image). A Laplacian or Gaussian pyramid is constructed from each of the two input images, and motion parameters are estimated in a coarse-to-fine manner. Within each pyramid level the sum of squared differences (SSD) measure integrated over regions of interest (which is initially the entire image region) is used as a match measure:

$$E(U(P)) = \sum_P (I_r(P) - I_t(P - U(P)))^2 \quad (5)$$

where I is the Laplacian or Gaussian filtered image intensity. The sum is computed over all the points P within the region and is used to denote the SSD error of the entire motion field within that region. The motion field is modeled by a set of global parameters (e.g., plane parameters) and local parameters (e.g., optical flow) as described above.

Numerical methods such as Gauss-Newton minimization is applied to the objective function described in equation (5) in order to estimate the unknown motion parameters and the resulting motion field. Starting with some initial values (typically zero), the hierarchical estimation algorithm iteratively refines the parameters in order to minimize the SSD error described in equation (5) from coarse to fine resolutions. After each motion estimation step, the current set of parameters is used to warp the neighboring image to the coordinate frame of the reference image, as described in equation (4), in order to reduce the residual displacement between the images.

The optical flow at each pixel is assumed to be locally constant in a small window around that pixel. The flow for a pixel is estimated by using all the pixels in its window. This process is repeated for each pixel and results in a smoothly varying flow field. In some implementations, dense optical flow is estimated using five windows 30, 32, 34, 36, 38, on and off-centered around each pixel under examination, as illustrated in FIG. 6. Local flow is computed for each window. The motion estimate that produces the smallest local error is used as the motion estimate for the pixel under consideration. Away from occlusion boundaries, the multiple windows 30-38 provide equally good estimates. However, at or near occlusion boundaries, the window with the best estimate will correspond only to the occluding surface. The non-optimal window estimates will come from the mixed estimate corresponding to the boundary between the occluding and occluded surfaces. Choosing the best estimate leads to crisp correspondence maps that are sub-pixel accurate at occluding boundaries.

Referring back to FIG. 2B, the motion evaluation module 15 computes an alignment accuracy map for each pairing of the reference image and a respective neighboring image based on the motion maps computed by the motion estimation module 14 (block 28). In some implementations, quality measures are computed based on correlations between the reference image and the re-mapped neighboring images. In some of these implementations, regions with low intensity variances optionally may be identified as being low-texture. The intensity means of corresponding low-texture regions in the aligned image pairs are compared. Pixels in low-texture regions with large difference in intensity means are assigned a correlation value of zero; whereas pixels in low-texture regions with little difference in intensity means are assigned a correlation value of one. The final alignment quality measure $M_{Align}$ is computed as follows, $$M_{Align} = \frac{\left[\sum_P (I_{ref}(P) - \overline{I_{ref}})(I_{re-mapped}(P) - \overline{I_{remapped}})\right]}{[N\sigma_{ref}\sigma_{remapped}]} \quad (6)$$

when $\sigma_{ref}^2 \leq \Omega$ AND $\sigma_{remapped}^2 \leq \Omega$ or $\sigma_{N\_ref}^2 < \Omega_N$ AND $\sigma_{N\_remapped}^2 < \Omega_N$ then $$\begin{cases} M_{Align} = 1.0, & \text{if } \Delta\mu^2 \leq \kappa\Omega \\ M_{Align} = 0.0, & \text{else} \end{cases} \quad (7)$$

where $\sigma_{ref}^2$ and $\sigma_{remapped}^2$ are the respective reference and remapped neighboring image variances within the correlation window; $\sigma_N^2 = \sigma^2/(\mu^2+c)$ is the mean normalized variance with μ being the mean and c a stabilizing constant to handle close-to-zero mean values; $\Omega$, $\Omega_N$ and κ are thresholding parameters, and N is the number of pixels in the correlation window.

In some implementations, the total alignment quality is determined by computing the geometric mean of the quality measure for each of the color (e.g., Red, Green, and Blue) spectral bands of the base images 12. The alignment quality measures for each pairing of the reference image and a respective neighboring image are contained in respective alignment accuracy maps.

Figure 7:
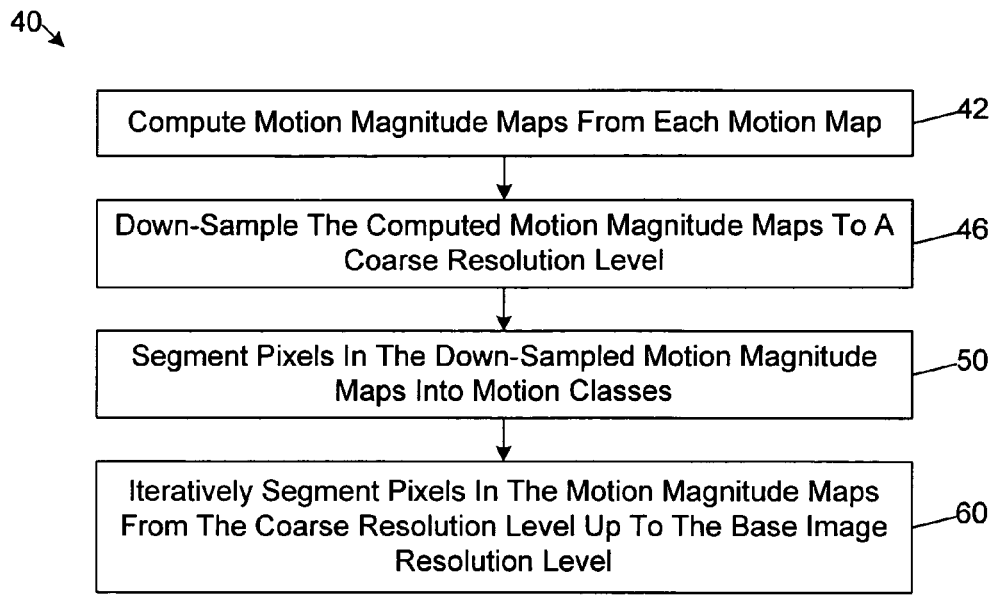
FIG. 7 is a flow diagram of an embodiment of a method of assigning respective regions of a reference image to motion classes based on computed motion maps in accordance with an implementation of the method of FIG. 2B.
Figure 8:
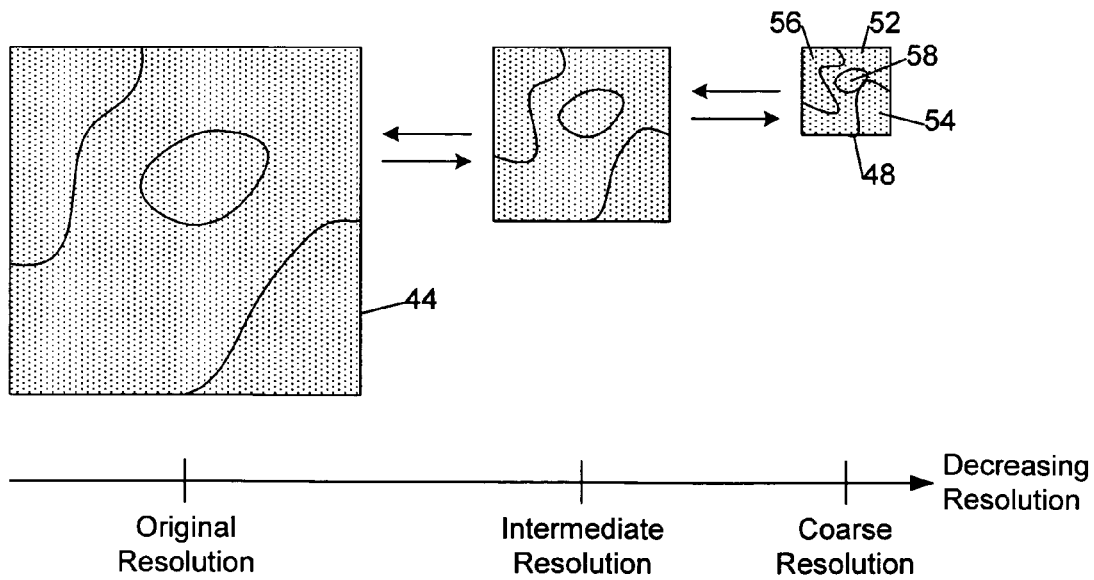
FIG. 8 is a diagrammatic view of segmented motion magnitude maps at different resolution levels in accordance with the method of FIG. 7.

Referring back to FIG. 2B and to FIGS. 7 and 8, the motion segmentation module 16 assigns respective regions of the reference image to motion classes based on the computed motion maps (block 40). The motion segmentation module 16 computes motion magnitude maps from each motion map (block 42). In some implementations, motion magnitudes are computed by taking the square root of the sum of the squares of the x- and y-components of the motion vectors in the motion maps. The motion segmentation module 16 down-samples each of the computed motion magnitude maps 44 to a pyramid of coarser resolution levels, as shown in FIG. 8 (block 46).

The motion segmentation module 16 then segments pixels in the down-sampled motion magnitude maps 48 into motion classes (block 50). Motion segmentation module 16 may classify pixel regions in each down-sampled motion magnitude map into a respective set of motion classes (e.g., a high motion class region 58, intermediate motion class regions 54, 56, and a low motion class region 52) using any type of classification or segmentation method. For example, in some implementations, motion vectors in each motion magnitude map are segmented in accordance with a k-means clustering method. In these implementations, either the number of clusters or a set of clusters representing an initial partition between motion magnitudes in a given motion magnitude map may be pre-determined. The partition is refined iteratively by assigning pixels to each partition and re-computing the center of each cluster. The segmentation method iterates between the following steps:

1. Compute cluster centroids and use them as new cluster seeds; and
2. Assign each object to the nearest seed.

In some implementations, the final partition corresponds to a respective set of motion magnitude clusters 52, 54, 56, 58 for each coarse motion magnitude map in which the total distance between pixels (or pixel groups) and the centers of their respective clusters is minimized, while the distances between clusters are maximized.

The motion segmentation module 16 iteratively segments pixel motion magnitude maps from coarser resolution levels up to the original base image resolution level (block 60). The segmentation results from the previous resolution are used as the starting point for the same segmentation process applied to the next higher resolution level.

The separate motion class segmentation maps that are computed for each pairing of the reference image and a respective neighboring image are merged into a unified motion class segmentation map for the reference image. In some implementations, the motion segmentation module 16 assigns a given reference image pixel to the low motion class in the unified motion class segmentation map when the given pixel is assigned to the low motion class in all of the separate motion class segmentation maps. The motion segmentation module 16 assigns a given reference image pixel to the high motion class in the unified motion class segmentation map when the given pixel is assigned to the high motion class in any of the separate motion class segmentation maps. As explained above, some implementations include an intermediate motion class, where motion vectors that are assigned to the intermediate motion class have magnitudes higher than motion vectors assigned to the low motion class and lower than motion vectors assigned to the high motion class. In these implementations, the motion segmentation module 16 assigns a given reference image pixel to the intermediate motion class in the unified motion class segmentation map when the given pixel is unassigned to the high motion class in any of the separate motion class segmentation maps and is unassigned to the low motion class in all of the separate motion class segmentation maps.

Referring back to FIG. 2B, the up-projection module 18 up-projects the reference image, the motion class segmentation maps, the motion maps, and the alignment accuracy maps from the base image resolution level to the target image resolution level (block 62). In general, the reference image, the motion class segmentation maps, the motion maps, and the alignment accuracy maps may be up-projected to the target image resolution level using any type of resolution re-mapping or up-sampling technique. In some implementations, the reference image, the motion class segmentation maps, the motion maps, and the alignment accuracy maps are up-projected to a higher target image resolution using bi-cubic interpolation. In some other implementations, the reference image, the motion class segmentation maps, the motion maps, and the alignment accuracy maps are up-projected to a higher target image resolution by first using a 5-tap Gaussian filter to up-sample the reference image, the motion class segmentation maps, the motion maps, and the alignment accuracy maps, and then using interpolation to achieve sub-pixel accuracy.

Based on the up-projected motion maps, the adaptive synthesis module 20 re-maps the neighboring images to the coordinate frame of the target image (block 64). In some implementations, the neighboring images are up-projected to the target image resolution level and the up-projected neighboring images are re-mapped to the target image coordinate frame using the up-projected motion maps in accordance with application of equation (4) at the target image resolution level.

The adaptive synthesis module 20 applies a threshold to the up-projected alignment accuracy maps to produce respective synthesis maps for each of the neighboring images (block 66). The synthesis maps are used by the adaptive synthesis module 20 to classify motion vectors in each up-projected motion map into valid and invalid motion vector classes. In the illustrated embodiment, the threshold that is applied to the up-projected alignment accuracy maps is set to a level that ensures that the neighboring image pixels are sufficiently aligned with respect to the corresponding reference image pixels that they contain relevant information for reconstructing the target image. In some implementations, the alignment measures in the alignment accuracy maps are normalized to values in the range of ±1 and the threshold is set to approximately 0.8. Pixels in the up-projected motion maps with alignment accuracy measures above the threshold are classified as valid motion pixels, whereas pixels with alignment accuracy measures below the threshold are classified as invalid motion pixels.

Figure 9:
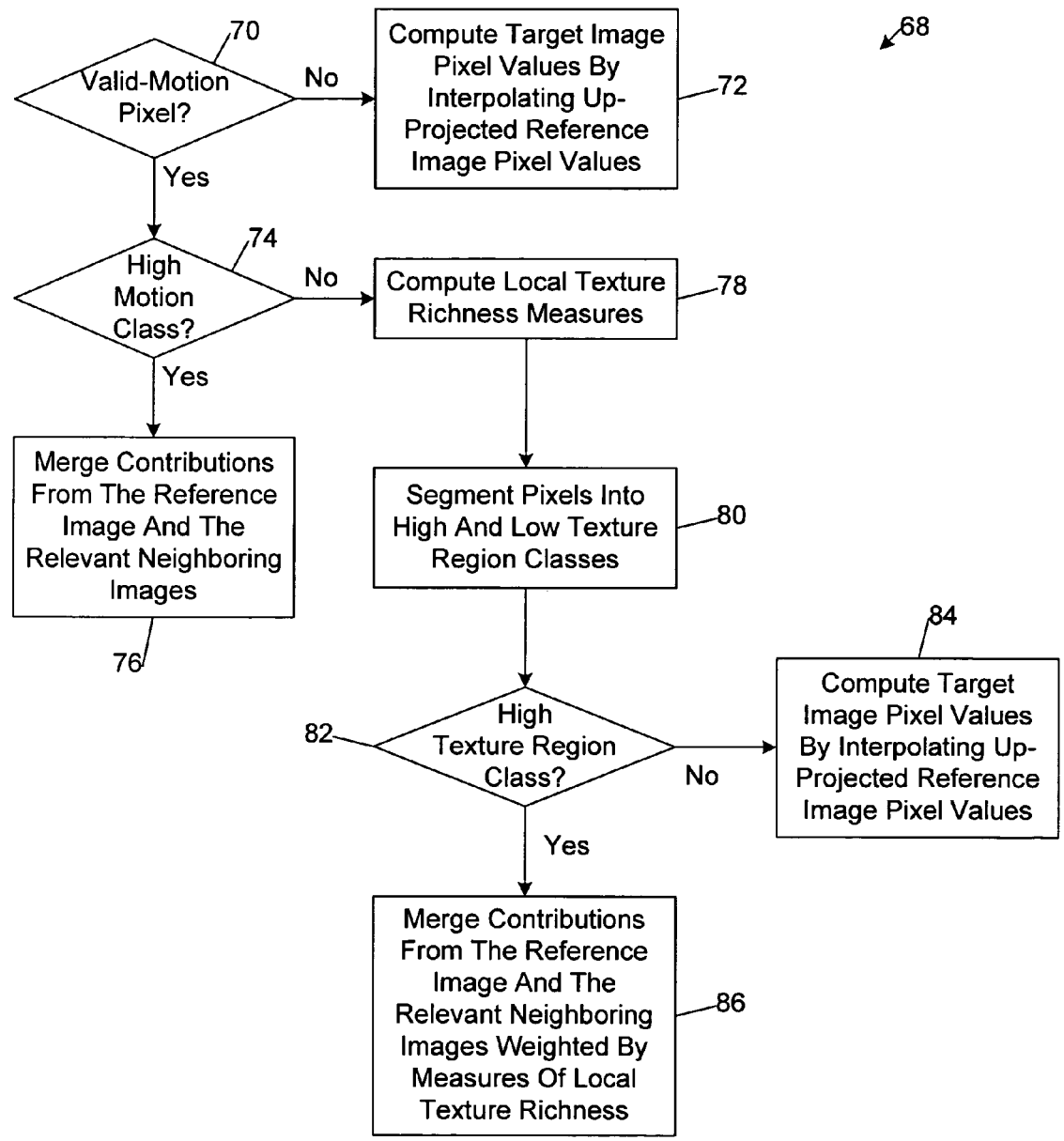
FIG. 9 is a flow diagram of an embodiment of a method of computing pixel values for a target image based on pixel value contributions from a sequence of base images.

Referring to FIGS. 2 and 9, the adaptive synthesis module 20 computes values for the target image based on pixel value contributions from the reference image and a selected number of relevant neighboring images (block 68). In particular, the adaptive synthesis module 20 selects the pixel value contributions in accordance with the up-sampled motion class segmentation maps and the synthesis maps. In the illustrated embodiments, the number of relevant neighboring images decreases with the degree of the motion class to which the target image pixels are assigned. In some implementations, only the two nearest neighbors of the reference image contribute pixel values to high motion class target image pixels, only the four nearest neighbors (i.e., two nearest neighbors on either side) of the reference image contribute pixel values to intermediate motion class target image pixels, and only the six nearest neighbors (i.e., three nearest neighbors on either side) of the reference image contribute pixel values to low motion class target image pixels.

For pixels in the neighboring images that are identified as having invalid motion vectors according to the synthesis maps, their contribution to the target image is zero. For target image pixels whose corresponding neighboring image pixels are all identified as having invalid motion vectors (block 70), the adaptive synthesis module 20 computes target image pixel values by interpolating up-projected reference image pixel values (block 72). In some implementations, the adaptive synthesis module 20 uses bi-cubic interpolation to compute values of target image pixels associated with invalid motion vectors in all neighboring images.

For target image pixels assigned to the high motion class with at least one neighboring image pixel with valid motion vectors (blocks 70, 74), the adaptive synthesis module 20 computes pixel values by merging contributions from the reference image and the two relevant nearest re-mapped neighboring images (block 76). In some implementations, the high motion class target image pixels are computed by a pixel-wise weighted combination given by equation (8):

$$I_{Target} = \frac{\sum_j \omega_{T_j} \omega_{Align_j}(P) I_j(P)}{\sum_j \omega_{T_j} \omega_{Align_j}(P)} \quad (8)$$

where $I_{Target}$ is the synthesized target image, $\omega_{T_j}$ is a weight for each of the re-mapped neighboring images, and $\omega_{Align_j}$ is a pixel-wise weight related to the alignment accuracy measure. In the case of a video stream, for example, weights $\omega_{T_j}$ may be set to values that are inversely proportional to the temporal distance between the reference image and the neighboring images. The weights $\omega_{Align_j}$ may be set to values that are proportional to the pixel-wise alignment quality measure if the measure is classified as a valid pixel in the corresponding synthesis map; otherwise it is set to be zero. The weights $\omega_{Align_j}$ may vary from pixel to pixel, and from image to image. This alignment-quality-related weighting guarantees that only relevant and valid information from well-aligned images is used during the rendering process and that unreliable information is ignored.

For target image pixels assigned to the intermediate and low motion classes (blocks 70, 74), the adaptive synthesis module 20 computes measures of local texture richness (block 78). Texture descriptors can be statistical, structural, or syntactic. In some implementations, a statistical descriptor is used. In these implementations, for a small local region around each pixel in the intermediate and low motion class regions, the adaptive synthesis module 20 computes the standard deviation of the Laplacian image, the skewness of the gradient value distribution, and the edge frequency as measures of local texture content. In some implementations, both the gradient image and the Laplacian image are computed during the motion estimation process (block 24; FIG. 2B). The adaptive synthesis module 20 may use any type of edge detection technique to find edges in the target and neighboring images. For example, in one implementation, the adaptive synthesis module 20 uses a Sobel edge detector, which performs a two-dimensional gradient measurement on the images, to compute edge directions and magnitudes. The Sobel edge detector uses a pair of 3×3 convolution masks, one of which estimates the gradient in the x-direction (columns) and the other of which estimates the gradient in the y-direction (rows).

The adaptive synthesis module 20 segments intermediate and low motion class pixels into high and low texture region classes based on the computed local texture richness measures (block 80). In some implementations, if the computed texture richness measure is below an empirically-determined threshold value, the adaptive synthesis module 20 segments the pixels into the low texture region class; otherwise the pixels are segmented into the high texture region class.

For intermediate and low motion class pixels assigned to the low texture region class in the reference image and all the corresponding neighboring images (block 82), the adaptive synthesis module 20 computes corresponding target image pixel values by interpolating up-projected reference image values (block 84). For intermediate and low motion class pixels assigned to the high texture region class in the reference image or any of the corresponding neighboring images (block 82), the adaptive synthesis module 20 computes target image pixel values by merging contributions from the up-projected reference image and the relevant re-mapped neighboring images in accordance with equation (9) (block 86):

$$I_{Target} = \frac{\sum_j \omega_{T_j} \omega_{Align_j} \omega_{Texture_j}(P) I_j(P)}{\sum_j \omega_{T_j} \omega_{Align_j} \omega_{Texture_j}(P)} \quad (9)$$

where $\omega_{Texture_j}$ is a weight with values ranging from 0 to 1 that are set based on the computed local texture richness measures. For example, in some implementations, $\omega_{Texture_j}$ corresponds to the computed local texture measure normalized to the 0 to 1 value range.

The above-described resolution enhancement embodiments may be applied to one or all of the luminance and chrominance components of the base images 12. In some embodiments, the resulting resolution-enhanced target images 22 may be subjected to one or more post-processing methods, including color re-mapping, sharpening, and de-scintillation methods.

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A machine-implemented image processing method, comprising:

computing a respective motion map for each pairing of a reference image and a respective image neighboring the reference image in a sequence of base images, each motion map comprising a set of motion vectors mapping reference image pixels to respective neighboring image pixels;

assigning respective regions of a target image to motion classes based on the computed motion maps, the target image having a target resolution level and the base images having a base resolution level equal to or lower than the target resolution level; and computing pixel values for the target image based on corresponding pixel value contributions from the base images selected in accordance with the motion classes assigned to the target image regions.

2. The method of claim 1, wherein computing motion maps comprises generating for each image pair respective dense motion vectors describing motion at pixel locations with respective sets of parameters in a motion parameter space at sub-pixel accuracy.

3. The method of claim 1, wherein assigning regions of the target image to motion classes comprises assigning pixels of the reference image to respective motion classes and up-projecting the motion class assignments to pixels of the target image.

4. The method of claim 3, wherein assigning reference image pixels to motion classes comprises computing motion magnitude maps from each motion map, down-sampling the computed motion magnitude maps to a pyramid of motion magnitude maps at respective resolution levels lower than the base resolution level, and segmenting pixels in the pyramid of down-sampled motion magnitude maps into motion classes.

5. The method of claim 4, wherein assigning reference image pixels to motion classes further comprises iteratively segmenting pixels in the pyramid of motion magnitude maps from a coarsest resolution level up to the base resolution level, wherein segmentation from each coarser resolution level is up-sampled to initialize the segmentation at a finer resolution level, and refined by further segmentation at the finer resolution level.

6. The method of claim 3, wherein assigning reference image pixels to motion classes comprises generating a separate motion class segmentation map for each pairing of the reference image and a respective neighboring image and merging the separate motion class segmentation maps into a unified motion class segmentation map for the reference image.

7. The method of claim 6, wherein reference image pixels are respectively assigned to a motion class selected from a motion class set including a high motion class and a low motion class, and motion vectors assigned to the high motion class have higher magnitudes than motion vectors assigned to the low motion class.

8. The method of claim 7, wherein merging the separate motion class segmentation maps comprises assigning a given reference image pixel to the low motion class in the unified motion class segmentation map when the given pixel is assigned to the low motion class in all of the separate motion class segmentation maps, and assigning a given reference image pixel to the high motion class in the unified motion class segmentation map when the given pixel is assigned to the high motion class in any of the separate motion class segmentation maps.

9. The method of claim 8, wherein the motion class set further includes an intermediate motion class, and motion vectors assigned to the intermediate motion class have magnitudes higher than motion vectors assigned to the low motion class and lower than motion vectors assigned to the high motion class.

10. The method of claim 9, wherein merging the separate motion class segmentation maps comprises assigning a given reference image pixel to the intermediate motion class in the unified motion class segmentation map when the given pixel is unassigned to the high motion class in any of the separate motion class segmentation maps and is unassigned to the low motion class in all of the separate motion class segmentation maps.

11. The method of claim 1, further comprising computing an alignment accuracy map for each pairing of the reference image and a respective neighboring image based on the computed motion maps.

12. The method of claim 11, wherein computing alignment accuracy maps comprises re-mapping neighboring images to a coordinate frame of the reference image using respective motion maps, and computing correlation measures between pixels of the reference image and pixels of each of the motion-compensated neighboring images.

13. The method of claim 11, further comprising up-projecting the computed alignment accuracy maps from the base image resolution level to the target image resolution level.

14. The method of claim 13, further comprising up-projecting the motion maps from the base image resolution level to the target image resolution level, and classifying motion vectors in each up-projected motion map into valid and invalid motion vector classes based on the up-projected alignment accuracy maps.

15. The method of claim 14, wherein values of target image pixels with corresponding pixels in all neighboring images being associated with motion vectors in the invalid motion vector class are computed by interpolating up-projected pixel values of the reference image.

16. The method of claim 1, further comprising up-projecting the motion maps from the base image resolution level to the target image resolution level.

17. The method of claim 16, further comprising re-mapping the neighboring images to the reference frame of the up-projected reference image using the respective up-projected motion maps.

18. The method of claim 1, wherein regions of the target image are respectively assigned to a motion class selected from a motion class set including a high motion class and a low motion class, and motion vectors of regions assigned to the high motion class have higher magnitudes than motion vectors of regions assigned to the low motion class.

19. The method of claim 18, wherein computing target image pixel values in regions assigned to the high motion class comprises computing a pixel-wise combination of pixel value contributions from the up-projected reference image and the re-mapped neighboring images weighted based on pixel-wise measures of alignment accuracy between the reference image and the corresponding neighboring images.

20. The method of claim 19, wherein pixel value contributions from the re-mapped neighboring images are additionally weighted based on measures of temporal distance between the reference image and the corresponding neighboring images.

21. The method of claim 18, wherein computing target image pixel values in regions assigned to the low motion class comprises classifying low motion class reference image pixels and their corresponding pixels in the neighboring images based on measures of local texture richness.

22. The method of claim 21, wherein low motion class reference image pixels and their corresponding pixels in the neighboring images are quantitatively evaluated for local texture richness, and are classified into a texture class selected from the texture class set including a high texture region class and a low texture region class, and pixels assigned to the high texture region class have higher local texture measures than pixels assigned to the low texture region class.

23. The method of claim 22, wherein values of target image pixels classified into the low texture region class in the reference image and all of the respective neighboring images, are computed by interpolating up-projected pixel values of the reference image.

24. The method of claim 22, wherein a value of a given target image pixel classified into the high texture region class in the reference image or any respective neighboring images is computed based on a pixel value contribution from the up-projected reference image, and a pixel value contribution from a given re-mapped neighboring image weighted based on a measure of local texture richness computed for the given pixel, a measure of motion estimation accuracy computed for the given pixel, and a measure of temporal distance of the neighboring image from the reference image.

25. The method of claim 18, wherein values of target image pixels are computed based on pixel value contributions from a number of base images neighboring the reference image, the number of neighboring base images being different for different motion classes.

26. The method of claim 25, wherein values of target image pixels assigned to the high motion class are computed based on pixel value contributions from a fewer number of neighboring base images than the values of target image pixels assigned to the low motion class.

27. The method of claim 26, wherein the motion class set further includes an intermediate motion class, the motion vectors of regions assigned to the intermediate motion class have lower magnitudes than motion vectors of regions assigned to the high motion class and higher magnitudes than motion vectors of regions assigned to the low motion class, and values of target image pixels assigned to the intermediate motion class are computed based on pixel value contributions from a fewer number of neighboring base images than the values of target image pixels assigned to the low motion class but a higher number of neighboring base images than the values of target image pixels assigned to the high motion class.

28. An image processing machine, comprising:
a computer-readable memory storing computer process instructions; and
a computer processor operable to execute the computer process instructions and perform operations comprising
computing a respective motion map for each pairing of a reference image and a respective image neighboring the reference image in a sequence of base images, each motion map comprising a set of motion vectors mapping reference image pixels to respective neighboring image pixels at sub-pixel accuracy,
assigning respective regions of a target image to motion classes based on the computed motion maps, the target image having a target resolution level and the base images having a base resolution level equal to or lower than the target resolution level, and
computing pixel values for the target image based on corresponding pixel value contributions from the re-mapped base images selected in accordance with the motion classes assigned to the target image regions.

29. The machine of claim 28, wherein the computer processor is operable to assign regions of the target image to motion classes by assigning pixels of the reference image to respective motion classes and up-projecting the motion class assignments to pixels of the target image.

30. The machine of claim 29, wherein the computer processor is operable to assign reference image pixels to motion classes by computing motion magnitude maps from each motion map, down-sampling the computed motion magnitude maps to a pyramid of motion magnitude maps at respective resolution levels lower than the base resolution level, and segmenting pixels in the pyramid of down-sampled motion magnitude maps into motion classes.

31. The machine of claim 29, wherein the computer processor is operable to assign reference image pixels to motion classes by generating a separate motion class segmentation map for each pairing of the reference image and a respective neighboring image and merging the separate motion class segmentation maps into a unified motion class segmentation map for the reference image.

32. The machine of claim 28, wherein the computer processor is operable to compute an alignment accuracy map for each pairing of the reference image and a respective neighboring image based on the computed motion maps.

33. The machine of claim 32, wherein the computer processor is operable to compute alignment accuracy maps by re-mapped neighboring images to a coordinate frame of the reference image using respective motion maps, and computing correlation measures between pixels of the reference image and pixels of each of the motion-compensated neighboring images.

34. The machine of claim 33, wherein the computer processor is operable to up-project the computed alignment accuracy maps from the base image resolution level to the target image resolution level.

35. The machine of claim 34, wherein the computer processor is operable to up-project the motion maps from the base image resolution level to the target image resolution level, and classify motion vectors in each up-projected motion map into valid and invalid motion vector classes based on the respective up-projected alignment accuracy maps.

36. The machine of claim 35, wherein values of target image pixels with corresponding pixels in all neighboring images being associated with motion vectors in the invalid motion vector class are computed by interpolating up-projected pixel values of the reference image.

37. The machine of claim 28, wherein the computer processor is operable to up-project the motion maps from the base image resolution level to the target image resolution level, and re-map the neighboring images to the reference frame of the up-projected reference image using the respective up-projected motion maps.

38. The machine of claim 28, wherein:
regions of the target image are respectively assigned to a motion class selected from a motion class set including a high motion class and a low motion class, and motion vectors assigned to the high motion class have higher magnitudes than motion vectors assigned to the low motion class; and
the computer processor is operable to compute target image pixel values in regions assigned to the high motion class by computing a pixel-wise combination of pixel value contributions from the up-projected reference image and the respective re-mapped neighboring images weighted based on pixel-wise measures of alignment accuracy between the reference image and the corresponding neighboring images.

39. The machine of claim 38, wherein pixel value contributions from the re-mapped neighboring images are additionally weighted based on measures of temporal distance between the reference image and the corresponding neighboring images.

40. The machine of claim 38, wherein the computer processor is operable to compute target image pixel values in regions assigned to the low motion class based on classification of low motion class reference image pixels and corresponding pixels in the neighboring images based on measures of local texture richness.

41. The machine of claim 28, wherein values of target image pixels are computed based on pixel value contributions from a number of re-mapped base images neighboring the reference image, the number of neighboring base images being different for different motion classes.

42. A non transitory Computer readable medium storing computer-readable instructions operable to cause a computer to perform operations comprising:
  computing a respective motion map for each pairing of a reference image and a respective image neighboring the reference image in a sequence of base images, each motion map comprising a set of motion vectors mapping reference image pixels to respective neighboring image pixels at sub-pixel accuracy;
  assigning respective regions of a target image to motion classes based on the computed motion maps, the target image having a target resolution level and the base images having a base resolution level equal to or lower than the target resolution level; and
  computing pixel values for the target image based on corresponding pixel value contributions from the re-mapped base images selected in accordance with the motion classes assigned to the target image regions.

43. The computer-readable medium of claim 42, wherein the computer-readable instructions are operable to cause the computer to assign regions of the target image to motion classes by assigning pixels of the reference image to respective motion classes and up-projecting the motion class assignments to pixels of the target image.

44. The computer-readable medium of claim 43, wherein the computer-readable instructions are operable to cause the computer to assign reference image pixels to motion classes by computing motion magnitude maps from each motion map, down-sampling the computed motion magnitude maps to a pyramid of motion magnitude maps at respective resolution levels lower than the base resolution level, and segmenting pixels in the pyramid of down-sampled motion magnitude maps into motion classes.

45. The computer-readable medium of claim 43, wherein the computer-readable instructions are operable to cause the computer to assign reference image pixels to motion classes by generating a separate motion class segmentation map for each pairing of the reference image and a respective neighboring image and merging the separate motion class segmentation maps into a unified motion class segmentation map for the reference image.

46. The computer-readable medium of claim 42, wherein the computer-readable instructions are operable to cause the computer to compute an alignment accuracy map for each pairing of the reference image and a respective neighboring image based on the computed motion maps.

47. The computer-readable medium of claim 46, wherein the computer-readable instructions are operable to cause the computer to compute alignment accuracy maps by re-mapping neighboring images to a coordinate frame of the reference image using respective motion maps, and computing correlation measures between pixels of the reference image and pixels of each of the motion-compensated neighboring images.

48. The computer-readable medium of claim 47, wherein the computer-readable instructions are operable to cause the computer to up-project the computed alignment accuracy maps from the base image resolution level to the target image resolution level.

49. The computer-readable medium of claim 48, wherein the computer-readable instructions are operable to cause the computer to up-project the motion maps from the base image resolution level to the target image resolution level, and classify motion vectors in each up-projected motion map into valid and invalid motion vector classes based on the respective up-projected alignment accuracy maps.

50. The computer-readable medium of claim 49, wherein values of target image pixels with corresponding pixels in all neighboring images being associated with motion vectors in the invalid motion vector class are computed by interpolating up-projected pixel values of the reference image.

51. The computer-readable medium of claim 42, wherein the computer-readable instructions are operable to cause the computer to up-project the motion maps from the base image resolution level to the target image resolution level, and re-map the neighboring images to the reference frame of the up-projected reference image using the respective up-projected motion maps.

52. The computer-readable medium of claim 42, wherein:
  regions of the target image are respectively assigned to a motion class selected from a motion class set including a high motion class and a low motion class, and motion vectors assigned to the high motion class have higher magnitudes than motion vectors assigned to the low motion class; and
  the computer-readable instructions are operable to cause the computer to compute target image pixel values in regions assigned to the high motion class by computing a pixel-wise combination of pixel value contributions from the re-mapped neighboring images weighted based on pixel-wise measures of alignment accuracy between the reference image and the corresponding neighboring images.

53. The computer-readable medium of claim 52, wherein pixel value contributions from the re-mapped neighboring images are additionally weighted based on measures of temporal distance between the reference image and the corresponding neighboring images.

54. The computer-readable medium of claim 52, wherein the computer-readable instructions are operable to cause the computer to compute target image pixel values in regions assigned to the low motion class based on classification of low motion class reference image pixels and corresponding pixels in the neighboring images based on measures of local texture richness.

55. The computer-readable medium of claim 42, wherein values of target image pixels are computed based on pixel value contributions from a number of re-mapped base images neighboring the reference image, the number of re-mapped neighboring base images being different for different motion classes.

\* \* \* \* \*

UNITED STATES PATENT AND TRADEMARK OFFICE
CERTIFICATE OF CORRECTION

| | | |
|---|---|---|
| PATENT NO. | : 8,036,494 B2 | Page 1 of 1 |
| APPLICATION NO. | : 10/824692 | |
| DATED | : October 11, 2011 | |
| INVENTOR(S) | : Mei Chen | |

It is certified that error appears in the above-identified patent and that said Letters Patent is hereby corrected as shown below:

In column 15, line 12, in Claim 42, delete "Computer" and insert -- computer --, therefor.

Signed and Sealed this
Nineteenth Day of June, 2012

David J. Kappos
*Director of the United States Patent and Trademark Office*